(12) United States Patent
Inagaki et al.

(10) Patent No.: US 6,930,154 B2
(45) Date of Patent: Aug. 16, 2005

(54) METHOD FOR PRODUCING A HIGH-MOLECULAR WEIGHT FLOCCULANT

(75) Inventors: Yasuhito Inagaki, Kanagawa (JP); Haruo Watanabe, Kanagwa (JP); Tsutomu Noguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/797,310

(22) Filed: Mar. 10, 2004

(65) Prior Publication Data

US 2004/0171705 A1 Sep. 2, 2004

Related U.S. Application Data

(62) Division of application No. 09/935,516, filed on Aug. 23, 2001, now abandoned, which is a division of application No. 09/059,251, filed on Apr. 14, 1998, now Pat. No. 6,316,507.

(30) Foreign Application Priority Data

Apr. 16, 1997 (JP) .......................................... P9-098584
Apr. 22, 1997 (JP) .......................................... P9-104069
Mar. 31, 1998 (JP) .......................................... 10-087374

(51) Int. Cl.⁷ ................................................ C08F 8/10
(52) U.S. Cl. ................. 525/344; 525/329.1; 525/329.2; 525/329.3
(58) Field of Search .............................. 525/344, 329.1, 525/329.2, 329.3

(56) References Cited

U.S. PATENT DOCUMENTS

| | | |
|---|---|---|
| 2,579,451 A | 12/1951 | Polson |
| 2,721,113 A | 10/1955 | Downing et al. |
| 3,345,344 A | 10/1967 | Fetscher et al. |
| 3,864,312 A | 2/1975 | Suzuki et al. |
| 3,864,323 A | 2/1975 | Stoy |
| 3,948,870 A | 4/1976 | Stoy et al. |
| 4,526,935 A | 7/1985 | Wilkinson |

FOREIGN PATENT DOCUMENTS

| | | |
|---|---|---|
| DE | 3432569 C1 | 2/1986 |
| DE | 42 39 128 A1 | 5/1994 |
| EP | 0 067 362 A1 | 6/1982 |
| EP | 0 105 201 A2 | 4/1984 |
| EP | 0 135 727 A1 | 8/1984 |
| EP | 0 528 409 A1 | 8/1992 |
| EP | 0 528 409 A1 | 2/1993 |
| EP | 0 716 882 A1 | 6/1996 |
| FR | 2 308 663 | 11/1976 |
| WO | WO 91/18026 | 11/1991 |

OTHER PUBLICATIONS

Chemical Abstracts, vol. 100, No. 8, Feb. 1984, Columbus, Ohio, US; Abstract No. 52243j, XP–002071630, JP–5896604 A (Sanyo Chemical).

*Primary Examiner*—Bernard Lipman
(74) *Attorney, Agent, or Firm*—Sonnenschein, Nath & Rosenthal LLP

(57) ABSTRACT

A high-molecular flocculant rendered water-soluble by conversion of cyano groups contained in a high-molecular material, a method for producing the flocculant, and a method for efficiently processing water using the flocculant. A high-molecular material containing acrylonitrile as a monomer is processed safely to impart hydrophilicity to the material and the resulting product is used for water processing to contribute to environmental conservation. An amino compound is added to a cyano group containing high-molecular material to convert at least a portion of the cyano group ($—C\equiv N$) into a molecular structure portion having an imidamino structure and, if necessary, to convert at, least the portion into one of an acid salt, a quaternary ammonium salt or a hydrolyzate structure portion to give a high-molecular flocculant. Alternatively, a high-molecular material having cyano groups is hydrolysed to convert the cyano group into carbamoyl groups, carboxylic groups or their salts to give a high-molecular flocculant. This high-molecular flocculant is charged alone or in combination the water for processing various.

6 Claims, 1 Drawing Sheet

METHOD FOR PRODUCING A HIGH-MOLECULAR WEIGHT FLOCCULANT

CROSS REFERENCE TO RELATED APPLICATIONS

This is a divisional of U.S. application Ser. No. 09/935,516, now abandoned, filed on Aug. 23, 2001, which is a divisional of U.S. application Ser. No. 09/059,251, filed on Apr. 14, 1998 (now U.S. Pat. No. 6,316,507), which claims priority from the following Japanese Applications: Application No. P09-0985849, filed Apr. 16, 1997; Application No. P09-104069, filed Apr. 22, 1997; and Application No. 10-087374, filed Mar. 31, 1998. Applicant claims priority to and the benefit of the above-identified applications, the disclosures of which are expressly incorporated herein by reference to the extent permitted by law.

BACKGROUND OF THE INVENTION

This invention relates to a high-molecular flocculant rendered water-soluble by conversion of cyano groups contained in a high-molecular material, a method for producing the flocculant, and method for efficiently processing water using the flocculant.

DESCRIPTION OF THE RELATED ART

In the field of processing waste water, a flocculant is used as a reagent for causing aggregation and precipitation of micro-sized particles dispersed in waste water. In the waste water, such as industrial waste water, it is a frequent occurrence that mud or high-molecular impurities are dispersed as colloidal particles. The flocculant serves for aggregating these colloidal particles for purifying the polluted water.

Of the wide variety of known flocculants, those having a molecular structure of a long chain and exhibiting high hydrophilicity are high-molecular flocculants which are used extensively because addition of only a limited amount thereof to the colloidal particles leads to significant aggregating effects. The high-molecular flocculants are classified into an anionic type, a cationic type and a nonionic type depending on static charges on dissolution in water. Since a majority of colloidal particles are charged to the positive or negative polarity, extremely large flocs are formed to lower the turbidity highly efficiently by properly selecting the high-molecular flocculants depending on the polarity of the static charges.

In the field of manufacturing industrial products, high-molecular material, containing acrylonitrile as a monomeric unit, are used extensively. Among the high-molecular materials containing acrylonitrile, there are polystyrene based resins, typified by nitrite resins, ABS (acrylonitrile-butadiene-styrene resins), SAN resins (styrene-acrylonitrile resin), AAS resins (acrylonitrile-acryl-styrene resins) and ACS resins (acrylonitrile-chlorinated polyethylene-styrene resin), acrylic fibers obtained on spinning a polymer having acrylonitrile as a main monomeric unit, and NBR (acrylonitrile-butadiene rubber, also termed nitrite rubber).

A resin molded product, containing acrylonitrile as monomeric units, is superior in stiffness, dimensional stability and workability and hence is used frequently as a cover or a casing for various usages, a casing for an electric appliance or a car or as a material for components.

The acrylic fibers are lightweight, bulky and is excellent in heat insulating properties, skin touch feeling, weatherability and resiliency, so that they are used extensively for apparel alone or as a mixture with other fibers, such as wool or cotton.

The nitrite rubber exhibits superior weatherability against oils, such as fuel oil, machine oil or a tube oil, so that it is used as a fuel hose, oil seal or a belt and in particular for car use.

The acrylonitrile containing high-molecular material, used in a wide variety of industrial products, produces a large quantity of waste materials in the course of fabrication of the industrial products or on discarding of the used-up industrial products. The waste high-molecular materials are generally disposed of by techniques such as incineration, earth filling or re-melting. The former two technique belongs to discarding, while the later technique belongs to recycling.

The above-mentioned disposal techniques for the high-molecular material suffer from specified problems.

First, the incineration is accompanied by the problem of evolution of toxic gases during combustion of the waste material. That is, highly toxic cyan gas (HCN) is evolved due to cyano groups (—C≡N) contained in the acrylonitrile monomer unit and which constitutes one of side chains of the polymer. Another factor contributing to incineration difficulties is susceptibility to conversion into incombustible matter as a result of carbonization.

Re-melting is a technique of heat-melting the recovered waste material for re-molding, and represents an effective technique insofar as thermoplastic resins are concerned. However, the material tends to be deteriorated in quality due to lowering in the molecular weight or oxidation, while being liable to mixing of foreign matter, such as dust and dirt. If waste materials of different originating points are processed collectively, technical and cost problems are raised, such as the necessity of re-coloring due to coexistence of various coloring agents.

Thus, discarding by land filling is nowadays thought to be most proper measures. However, selection and procurement of the proper site for a processing plant is becoming difficult from year to year, while the problem of environmental pollution cannot be evaded without difficulties.

SUMMARY OF THE INVENTION

It is an object of the present invention to provide a method for manufacturing a high-molecular flocculants having superior flocculating properties by a simple and safe manner using the high-molecular material containing cyano groups as a starting material and a method for effective disposal of waste water employing this high-molecular flocculant.

The high-molecular flocculant of the present invention, proposed for accomplishing the above object, is such a flocculant in which at least a portion of cyano groups (—C—N) contained in the high-molecular material is converted to impart water-solubility to enable the use of the material as a flocculant.

Specifically, in one aspect, the present invention provides a high-molecular flocculant having a molecular structure portion comprised of an organic and/or inorganic amino compound added to at least a portion of cyano groups contained in a high-molecular material.

In another aspect, the present invention provides a high-molecular flocculant in which at least a portion of cyano groups contained in a high-molecular material has been converted into carbamoyl groups.

The former flocculant can be prepared by reacting the cyano group containing high-molecular material with an amino compound, while the latter can be prepared by hydrolyzing the cyano group containing high-molecular material.

In particular, if a used-up waste material from some other process is used as a high-molecular material for use as a starting material, resources can be exploited effectively by recycling thus contributing to environment conservation.

The high-molecular flocculant, thus obtained, can be injected into water for processing for water processing as a cationic or nonionic type high-molecular flocculant. It may also be used in conjunction with other nonionic, anionic or cationic high-molecular flocculant.

It is seen from above that the high-molecular flocculant according to the present invention is obtained as a result of hydrophilicity-imparting modification of the high-molecular material containing cyano groups, in particular cyano groups originating from acrylonitrile. Since the high-molecular material is likely to be produced in large quantities as industrial wastes, the present invention is highly effective in reducing toxic waste materials and effective utilization of resources.

Moreover, since this modification of the high-molecular material is achieved by addition of an amino compound or by a hydrolytic reaction, there is caused no problem such as emission of toxic gases during incineration thus evading the problem of new environmental pollution in the course of processing of waste materials. In addition, the high-molecular flocculant obtained as a result of processing of the waste materials exhibits superior properties in connection with the rate of flocculation, turbidity of the supernatant liquid or in the water content of the cake. Therefore, use of the high-molecular flocculant obtained as a result of processing of the waste materials, for water processing, leads to re-utilization of the usually discarded waste materials, thus contributing not only to reduction of the toxic waste materials and effective utilization of resources, but to environmental conservation through purification of waste water.

DESCRIPTION OF PREFERRED EMBODIMENTS

Figure 1:
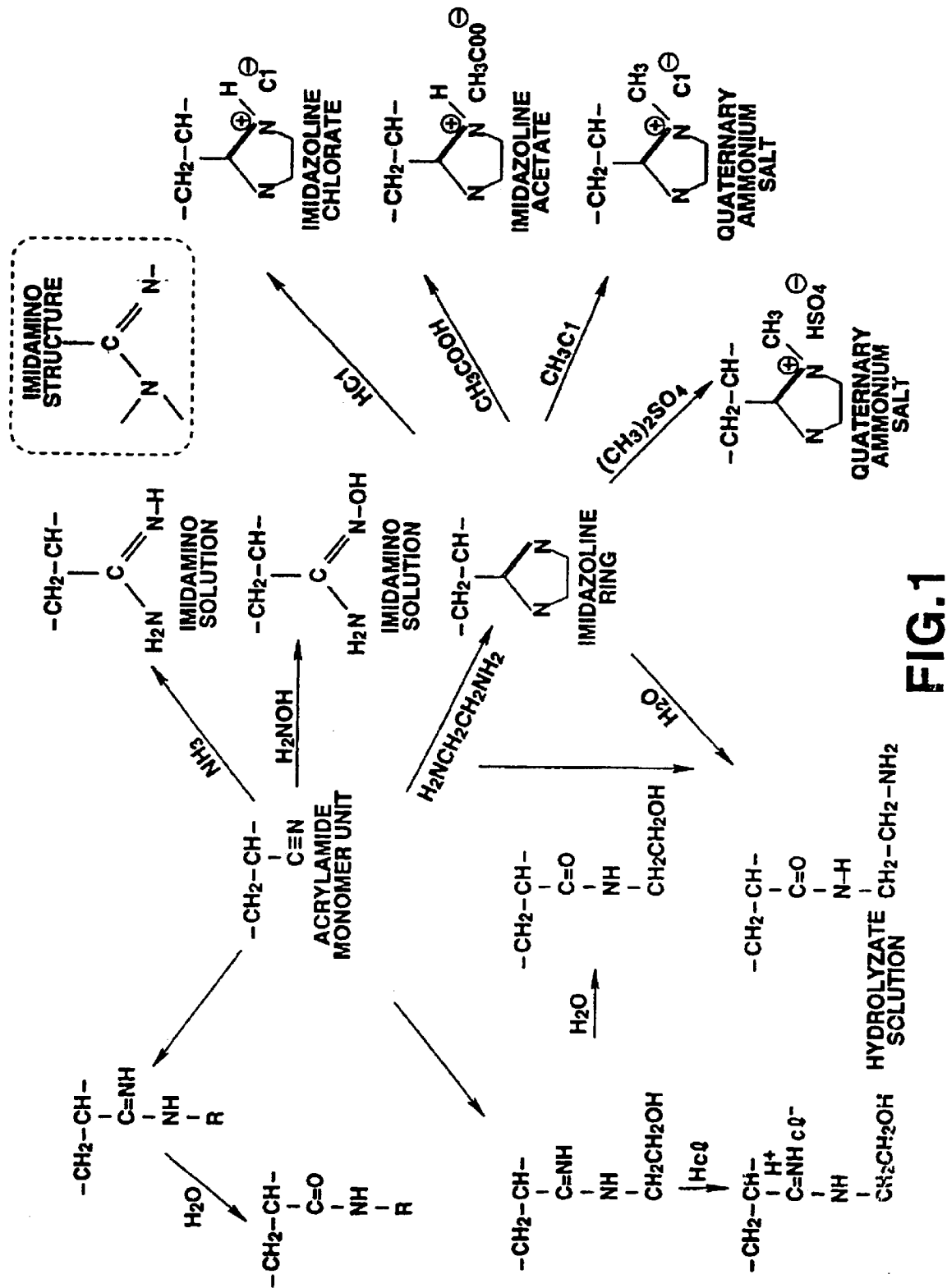
FIG. 1 illustrates the mechanism for addition reaction, salt forming reaction and hydrolysis in connection with manufacture of a high-molecular flocculant of the present invention.

The high-molecular flocculant of the present invention is obtained by introducing a highly hydrophilic molecular structure into at least a portion of cyano groups inherently contained in the high-molecular material or by subsequently carrying out salt formation or hydrolysis in case of necessity for adjusting water-solubility or flocculating properties. If it is desired to impart sufficient hydrophilicity to the yielded high-molecular flocculant or to preclude yielding of hydrogen cyanide with a view to safe waste discarding, it is preferred that the majority of cyano groups shall be converted into a highly hydrophilic molecular structure portion.

The highly hydrophilic molecular structure portion may be exemplified by a molecular structure portion having added inorganic or organic amino compounds or carbamoyl groups formed by hydrolysis of cyano groups.

As the amino compounds added to the cyano group in the former case, there are, for example, inorganic amino compounds, such as ammonia, hydrazine or hydroxylamine, and organic amino compounds, such as primary or secondary amines in which one or two hydrogen atoms of ammonia are substituted by hydroxy groups. The carbon skeleton of the hydrocarbon group may be saturated or non-saturated, of a chain or cyclic structure, straight-chained or branched. It is also possible for hetero elements other than carbon, hydrogen or nitrogen, such as oxygen, sulfur or halogens, to be contained in the skeleton of the hydrocarbon group.

Examples of the organic amino compounds include primary or secondary amines, substituted by C1–C12 saturated or unsaturated chained or cyclic hydrocarbon groups, primary or secondary amines containing two or more amino groups in one molecule and the aforementioned primary and secondary amines containing hetero atoms other than nitrogen in the molecule.

The primary and secondary amines containing two or more amino groups in one molecule may be enumerated by alkylene diamines, such as methylene diamine, ethylene diamine, trimethyl diamine (diamino propane), tetramethylene diamine (diamino butane), pentametylene diamine (diamino pentane), hexamethylene diamine (diamino hexane) or hexamethylene diamine (diaminoheptane), N-alkyl alkylene diamines, such as N-methyl methylene diamine, N-methyl ethylene diamine, N-benzyl ethylene diamine, N-methyl-1,3-diamino propane, N-butyl-1,3-diamino propane, N-dimethyl-1,3-diamino propane or N-butyl-1,3-diamino propane, alkylene polyamines (not less than three substituents), such as diethylene triamine, triethylene tetramine, tetraethylene pentamine, pentaethylene hexamine, polyethylene imine or piperidine and cyclic polyamines, such as 1,2-diamino cyclohexane, xylylene diamine and diamino diphenylmethane.

The amino compounds containing hetero atoms other than nitrogen in the molecule may be enumerated by hydroxyl alkylamines, such as ethanolamine, propanolamine, butanolamine and pentanolamine. Ethane thiolamine may also be used.

Although there is no limitation to the amino compounds, polyamine compounds, in particular ethylene diamine or 1,3-propane diamine, are preferably used for reaction with the high-molecular material since the polyamine compound can yield an imidazoline ring by reaction with cyano groups.

The molecular structure portion, yielded by addition of an organic or inorganic amino compound, has an imidamino or imidazoline structure, and exhibits basicity due to the lone electron pair on the nitrogen atom.

If this nitrogen atom is linked by coordinate bond to a proton furnished from the inorganic or organic acid, the nitrogen atom is charged positively to yield an acid salt. An inorganic acid, such as sulfuric acid, chlorosulfonic acid, chloric acid, nitric acid or phosphoric acid may be used. As an organic acid, acetic acid, lactic acid, phthalic acid or phenols may be used.

If a halogenated hydrocarbon or sulfuric acid ester is given the molecular structure portion, the nitrogen atom of the molecularstructure portion is linked to the hydrocarbon group of sulfuric acid ester or the halogenated hydrocarbon so as to be charged positively to yield a quaternary amine salt having the halogen as paired ions. The halogenated hydrocarbon used at this time mat be enumerated by methyl chloride or benzyl chloride, while the sulfuric acid ester may be enumerated by dimethyl sulfide or diethyl sulfide.

These acid salts and quaternary ammonium salts exhibit high water solubility.

On the other hand, the latter (hydrophilic groups such as carbamoyl group) is yielded by replacing at least a portion of the strongly hydrophobic cyan group inherently contained in the high-molecular material by a hydrophilic group, that is a carbamoyl group (CONH2) or by a carboxyl group (—COOH) or salts thereof (—COOX, where X is a cation).

This carbamoyl group or the carboxyl group is obtained by conversion of a functional group by a hydrolytic reaction. This conversion of the functional group occurs in the sequence of a cyan group—a carbamoyl group—a carboxyl group (or a salt thereof).

As a matter of course, it is necessary for the cyano group to be contained in the high-molecular material as a starting material for the high-molecular flocculant of the present invention in a form allowing addition thereto of ammonia or an amino compound or in a form allowing for substitution by a hydrophilic group. A high-molecular material containing acrylonitrile ($CH_2$=CH—CN) is preferred because the cyano group is linked as a side chain of the polymer molecule.

The molecular structure portions yielded on addition of ammonia, hydroxylamine, ethylene diamine, primary alkyl amine and ethanolamine to the cyano group of the acrylonitrile monomer unit are collectively shown in FIG. 1, along with structures obtained on yielding of the imidazoline ring by the action of ethylene diamine, acid salts, quaternary ammonium salts yielded on hydrolysis.

The above-mentioned high-molecular material may also be copolymers with other monomeric units (copolymers) without being limited to acrylonitrile homopolymers. These other monomeric units may be enumerated by one or more selected from the group consisting of acrylic acid, methacrylic acid, acrylic acid ester, methacrylic acid esters, butadiene, isoprene, chloroprene, vinyl chloride, acrylic amide, methacrylic amide, vinyl acetate, styrene, a-methyl styrene, ethylene, propylene, fumaric anhydride, malefic anhydride, itaconic anhydride, N-vinyl pyrrolidone and vinyl pyridine. The side chain of the ester bond of the acrylic acid ester and methacrylic acid ester is preferably constituted by saturated or unsaturated hydrocarbons having 1 to 10 carbon atoms.

Among representative high-molecular materials, obtained on combining acrylonitrile with the above-mentioned other polymers, there are, for example, acrylic fibers, nitrite fibers, SAN resins (styrene-acrylonitrile resins), acrylonitrile-butadiene resins, acrylonitrile-butadiene-styrene resins, acrylonitrile-butadiene-acrylic resins, acrylonitrile-chlorinated polyethylene resin, nitrite rubber and acrylonitrile-butadiene rubber.

Meanwhile, if the above-mentioned high-molecular material is an acrylonitrile homopolymer, the content of the cyano groups is 100 mol %. However, if the high-molecular material is the acrylonitrile copolymer, the content of the cyano groups naturally is varied depending on the content of the acrylonitrile monomer unit. If the content of the cyano groups is varied, the upper limit of the number of mots of the molecular structure portion yielded by the addition reaction of the amino compound and further the upper limit of the structure of hydrolysis yielded by changes in the salt the molecular structure portion can yield or in the molecular structure portion are changed. Similarly, if the content of the cyano groups is changed, the upper limit of the number of mots of the carbamoyl group introduced later, the carboxylic group introduced in place of the carbamoyl group on or the salts thereof are changed.

That is, if the content of the cyano groups is inherently small, the high-molecular flocculant of the present invention cannot exhibit high hydrophilicity or flocculating properties.

That is, according to the present invention, it is preferred that the cyano groups be contained in the high-molecular material in an amount corresponding to not less than 15 mol % of the total monomer units, that is that the content of the acrylonitrile monomer units be not less than 15 mol %. This amount is preferably not less than 25 mol %.

Meanwhile, the high-molecular material has the weight average molecular weight (Mw) of approximately not less than 5000. If the molecular weight is lower than this limit value, the flocculating properties as the high-molecular flocculant tend to be lost.

The high-molecular material, as the starting material for the high-molecular flocculant according to the present invention, may, of course, be a newly prepared material, that is a so-called virgin material. However, from the viewpoint of effective utilization of natural resources and prevention of environmental destruction, it is particularly desirable to use a used-up waste material.

These waste materials may be exemplified by, for example, a casing, a cover or a vessel used in electric appliances, cars, stationery, measurement instruments, building materials or in cosmetics. The waste materials may be in the form of a mixture with other waste materials. Examples of these other waste materials include synthetic or natural fibers, such as polyester, nylon, polyurethane, polyamides, polyphenylene ether, polycarbonates, polyphenylene sulfide, polyethylene terephthalate, polybutylene terephthalate, silk, wool or cotton, occasionally containing a variety of additives, such as coloring agents, stabilizers, water retention agents, combustion retardants, plasticizers or fillers.

If the above-mentioned other waste materials are used in conjunction, the content of these other waste materials is preferably not more than 60 wt %. If the content exceeds 60 wt %, the effect of the functional groups is strongly demonstrated such that desired water solubility is occasionally not imparted to the yielded high-molecular flocculant.

Thus, although the waste materials may be those recovered from factories, retail stores or homes, the waste materials from factories or retail stores, where waste materials of the unitary composition are likely to be produced in larger quantities, are more desirable than those recovered from holes and in which foreign waste materials tend to be mixed more readily.

Turning to the method for producing the high-molecular flocculant of the present invention, if the high-molecular flocculant has a molecular structure portion comprised of organic and/or inorganic amino compounds added to at least a portion of the cyano groups contained in the high-molecular material, it is sufficient if the above-mentioned acrylonitrile homopolymer or copolymer is used as a starting material and is reacted with the organic and/or inorganic amino compounds.

This reaction can be carried out by directly injecting the starting material into the amino compounds. After the end of the reaction, it is possible to pour a solvent in which the high-molecular flocculant is not soluble, such as acetone, into the reaction mixture in large quantities to re-precipitate the product.

Alternatively, the reaction can be carried out in an organic solvent, which may be a CS to C20 aliphatic chain hydrocarbon and/or cyclic hydrocarbon, C1 to C4 halogenated hydrocarbons, dichlorobenzene, aromatic hydrocarbons, ethers, ketones, esters, or non-protonic polar solvents, such as dimethyl sulfoxide (DMSO), dimethyl formamide (DMF), tetrahydrofuran (THF) or dioxane. If the organic solvent is used, the reaction product may be obtained as an aqueous solution by adding water to the reaction system and distilling off the solvent after the end of the reaction.

During the reaction, sulfur-based catalysts, such as sulfur powders, thiourea or thioacetoamide, are preferably used.

Although there is no limitation to the concentration of the amino compound during the reaction, it is preferably not lower than approximately 10%. If this concentration is too low, the speed of the addition reaction tends to be lowered, or the reaction of addition tends to be retarded. There is also no upper limit to the above concentration. If the reaction of addition is carried out by injecting a small amount of the high-molecular material into ethylene diamine, the concentration of ethylene diamine is approximately 100%.

The reaction temperature for the reaction of addition differs with the type of the high-molecular material used as the starting material, type of the catalyst used, type of the solvent used for the reaction system and with whether or not the solvent is used. If the reaction temperature is 0 to 150° C., the reaction is allowed to proceed with practically acceptable speed and controllability. If the temperature is lower than this range, the reaction speed is lowered thus possibly lowering the production efficiency. Conversely, if the temperature is higher than the above range; the high-molecular material tends to be lowered in molecular weight to lower the efficiency as the flocculant. This temperature range is preferably 20 to 120° C. and most preferably 40 to 80° C.

As for the reaction time duration, which depends on the type of the amino compound used, the reaction time of 30 minutes to 50 hours can give a target product with a practically acceptable yield. If the reaction time duration is shorter than this range, sufficient modification cannot be achieved. However, if once the chemical equilibrium is reached, prolongation of the reaction time has no meaning.

If, in the present invention, hydrolysis is to occur after the addition reaction of the amino compound, it can be carried out by acid hydrolysis employing an acid catalyst or alkali hydrolysis employing a basic catalyst.

As the acidic catalyst for acidic hydrolysis, inorganic acids, such as sulfuric acid, sulfuric anhydride, fuming sulfuric acid, chlorosulfonic acid, hydrochloric acid, nitric acid or phosphoric acid, may be used. These inorganic acids may be used in conjunction with inorganic peroxides, such as aqueous hydrogen peroxide, in order to promote the hydrolytic reaction.

As the basic catalyst for the alkaline hydrolysis, hydroxides, hydrogen carbonates, carbonates or acetates of Li, Na, K or $NH_4$ may be used.

In any type of the alkaline hydrolysis, the high-molecular material may be directly injected into inorganic acids, or into an aqueous alkaline solution of an inorganic base. Alternatively, the hydrolysis may be carried out using the same solvent as that used for the above-mentioned reaction of addition. The catalyst concentration, reaction temperature or the reaction time for hydrolysis may be set equivalently to the respective ranges discussed in connection with the above-mentioned reaction of addition.

The high-molecular flocculant, resulting from the above process, is of the nonionic type in the stage in which it has acquired the molecular structure portion directly after addition of the amino compound, and is of the strong cation type on converting this molecular structure portion into an acid salt or a quaternary ammonium salt. That is, with the above-described manufacturing method of the high-molecular flocculant, it is possible to produce flocculants of the nonionic type and the cationic type by judiciously selecting and combining the stages of the progress of the reaction of addition and the salt-forming reaction.

For converting the cyano group for introducing carbamoyl groups, carboxylic groups or salts thereof, the aforementioned acrylonitrile homopolymers or copolymers are used as the starting material, that is as a basic material for hydrolysis.

The hydrolysis is roughly classified into an acidic hydrolysis employing an acidic catalyst and hydrolysis employing the basic catalyst. Any of these hydrolysis types may be used in the present invention.

As the acidic catalyst for the above-mentioned acidic hydrolysis, inorganic acids, such as sulfuric acid, sulfuric anhydride, fuming sulfuric acid, chlorosulfonic acid, hydrochloric acid, nitric acid or phosphoric acid, may be used. These inorganic acids may be used in conjunction with inorganic peroxides, such as aqueous hydrogen peroxide, in order to promote the hydrolytic reaction. Since the acidic hydrolysis of the high-molecular material containing cyano groups is satisfactory in controllability, the reaction itself can be carried out in one step by properly selecting the reaction temperature and the reaction time so that a desired content of the carbamoyl groups will be achieved.

Although there is no particular limitation to the concentration of the inorganic acid, it is preferably set to approximately not less than 10%. If this concentration is too low, it may occur that the reaction speed of the hydrolysis is lowered or the hydrolytic reaction cannot proceed sufficiently. There is also no particular limitation to the upper limit of the concentration. If hydrolysis is carried out by charging a small quantity of the high-molecular material into sulfuric acid, the concentration of the inorganic acid is approximately 100%.

As the basic catalyst for the alkaline hydrolysis, inorganic bases, such as hydroxides, hydrogen carbonates, carbonates or acetates of Li, Na, K or $NH_4$ may be used.

However, alkaline hydrolysis is in need of a higher temperature than in the case of the acidic hydrolysis described above, such that, if this temperature condition is once achieved, the reaction proceeds speedily. The result is that the yielded high-molecular flocculant is lowered in molecular weight, or the reaction of conversion of the cyan group through a carbamoyl group to a carboxylic group or its salt proceeds at a time to render it difficult to control the introduced amount of ionic groups, that is carboxylic anions.

Therefore, the basic catalyst is not used from the outset of the reaction, and is preferably used in the second stage in case of the two-stage hydrolysis. That is, acidic hydrolysis by the acidic catalyst is first carried out in the first stage to prescribe substantially the amount of the carbamoyl groups introduced and alkaline hydrolysis is then carried out in the second stage in order to convert a further portion of the carbamoyl groups into carboxylic groups or salt thereof.

In any type of the alkaline hydrolysis, the high-molecular material may be directly injected into inorganic acids, or into an aqueous alkaline solution of an inorganic base.

Alternatively, the above hydrolysis may be carried out in an organic solvent, which may be a CS to C20 aliphatic chain hydrocarbon and/or cyclic hydrocarbon, C1 to C4 halogenated hydrocarbons, aromatic hydrocarbons, ethers, ketones, esters, or non-protonic polar solvents, such as dimethyl sulfoxide, dimethyl formamide, tetrahydrofuran or dioxane.

The method for ultimate recovery of the high-molecular flocculant in the above-described manufacturing method differs with the system of the hydrolytic reaction. If, for example, the high-molecular material is directly charged into inorganic acid, it is possible to pour a solvent in which the high-molecular flocculant is not soluble, such as acetone, into the reaction mixture in large quantities to re-precipitate the product. If the solvent is used during hydrolysis, the reaction product may be obtained as an aqueous solution by neutralizing an excess acidic catalyst or a basic catalyst and by distilling off the solvent.

With the reaction temperature for hydrolysis ranging between 0 to 180° C., the reaction is allowed to proceed with practically satisfactory speed and controllability, although the reaction temperature differs with the types of the high-molecular material used as a starting material, the catalyst constituting the reaction system, and the presence or absence of the solvent. The reaction temperature is more preferably 20 to 150° C. and most preferably 60 to 130° C.

The high-molecular flocculant, obtained as described above, is of the nonionic type by introducing the carbamoyl group and is of the anionic type by substituting carboxylic acid or carboxylates for a portion of the carbamoyl group.

Since the high-molecular flocculant of the present invention is at any rate of the nonionic, cationic or anionic type, it may be used for water processing in accordance with the usual method of exploiting the nonionic, cationic or anionic type high-molecular flocculant. Alternatively, the high-molecular flocculant of the present invention may be used in conjunction with various other flocculants.

The usable nonionic high-molecular flocculants may be exemplified by a synthetic system, such as polyacrylic amide, polymethacrylic amide or polyoxyethylene, or natural systems, such as starch, guar gum, gelatine or the like sugar, or proteins.

The cationic high-molecular flocculants include quaternary products of dialkyl aminoalkyl (meth)acrylate, where the quaternarification agents include methyl chloride, dimethyl sulfate and benzyl chloride, or acid salts thereof, where acid salts include inorganic acid salts, such as hydrochlorates or sulfates, and organic acid salts, such as acetates, polymers or copolymers thereof with (meth)acrylamide such as polymers of methyl chloride quaternary product of dimethyl aminoethyl acrylate or a copolymer thereof with acrylic amide. The cationic high-molecular flocculants also include quaternary product of dialkyl aminoalkyl (meth) acrylic amide or an acid salt thereof, and polymers or copolymers thereof with (meth)acrylic amide, such as copolymer of methyl chloride quaternary product of dimethyl amino propyl and acrylic amide. The cationic high-molecular flocculants also include cationated modified product of polyacrylamide, such as Mannich modified product and Hoffman decomposition product of polyacrylamide, and an epihadrin-amine condensates, such as a polycondensate of epihadrin and C2 to C6 alkylene diamine. The cationic high-molecular flocculants also include polydimethyl diallyl ammonium chloride, polyvinyl imidazoline and/or salts thereof, dicyan diamide condensates, such as a formalin condensate of dicyanamide and ammonium chloride. The cationic high-molecular flocculants also include polyethylene imine, its quaternary product or acid salts thereof polyvinyl imidazole, its quaternary product or acid salts thereof, poly-4-vinyl benzyl trimethyl ammonium chloride, chitosan and its salts. The cationic high-molecular flocculants also include acidic hydrolyzates of N-vinyl formamide/acrylonitrile copolymer, its quaternary product or acid salts, polyvinyl pyridine and tis quaternary product or acid salts. The cationic high-molecular flocculants further include an alkylene dichloride and polyalkylene polyamine condensates, aniline-formaldehyde polycondensates, polyhexameythylene thiourea acetate, polyamino acids, such as polylysin, polyglutamic acid and its salts.

The anionic high-molecular flocculants include partial hydrolyzates of polyacrylic amide and polymethacrylic amide, copolymers of acrylic acid or methacrylic acid and acrylic amide or methacrylic amide and salts thereof. The anionic high-molecular flocculants also include acrylic acid or methacrylic acid and acrylic amide or methacrylic amide and 2-acryl amide-methyl propane sulfonic acid or vinyl sulfonic acid ternary copolymer and salts thereof. The anionic high-molecular flocculants also include sodium salts of alginic acid, Guar gum, carboxymethyl cellulose and starch, polystyrene sulfonic acid and salts thereof. The anionic high-molecular flocculants further include sulfonated products and salts of polystyrene-based resin waste materials, such as polystyrene, high-impact polystyrene, ABS resin, SAN resin, nitrite rubber. The waste materials may contain up to 60 wt % of polyphenylene ether, polycarbonates, polyethylene terephthalates, polyamides and polyphenylene sulfide.

Of these high-molecular flocculants, sulfonated styrene-based polymers are desirable in that these exhibit high clarifying effect for a liquid suspension and can be fabricated using waste materials as the high-molecular flocculant of the present invention.

Examples of the styrene-based polymers used for the high-molecular flocculants include styrene-butadiene, styrene-acrylonitrile, styrene-butadiene-acrylonitrile, styrene-(meth)acrylic acid, styrene-(meth)acrylate (aliphatic hydrocarbon having 1 to 4 carbon atoms), styrene-acrylonitrile-(meth)acrylate (aliphatic hydrocarbon having 1 to 4 carbon atoms), styrene-butadiene(meth)acrylate (aliphatic hydrocarbon having 1 to 4 carbon atoms), styrene-malefic anhydride, styrene-acrylonitrile (meth)acrylate (aliphatic hydrocarbon having 1 to 4 carbon atoms), styrene-butadiene-acrylonitrile and styrene-malefic anhydride. Preferred are styrene-butadiene, styrene-acrylonitrile, styrene-butadiene-acrylonitrile, styrene-malefic anhydride, styrene-acrylonitrile(meth)acrylic acid ester (aliphatic hydrocarbon having 1 to 4 carbon atoms) and styrene-butadiene (meth)acrylate (aliphatic hydrocarbon having 1 to 4 carbon atoms). Most preferred are styrene-butadiene, styrene-acrylonitrile, styrene-butadiene-acrylonitrile, styrene-maleic anhydride.

The above-mentioned styrene-based polymers may be a newly prepared material, that is a so-called virgin material, for producing the high-molecular flocculant, waste materials from factories, retail stores or homes (waste materials) or the combination of the virgin material and the waste material. For re-exploitation of the polystyrene-based resin products, manufactured in large quantities as general-purpose resins, and for maintaining the earth's environments, it is more desirable to use the waste materials rather than the virgin materials, as the styrene-based polymers.

If the waste materials are used, polymers other than the above-mentioned styrene-based polymers may be contained in addition to the styrene-based polymers. These other polymers may be exemplified by polyphenylene ether, polycarbonates, polyphenylene sulfides and polyethylene terephthalates. Most preferred are polyphenylene ether and polycarbonates. The content of these other polymers is preferably not more than approximately 60 wt %.

The above-mentioned styrene-based polymers are sulfonated in a solvent containing sulfonating agents. The sulfonated styrene-based polymer is converted into high-molecular flocculant by neutralizing the sulfone groups and subsequently distilling off the solvent and the sulfonating agent.

These sulfonating agents may be enumerated by sulfuric anhydride, fuming sulfuric acid, chlorosulfonic acid and concentrated sulfuric acid. These sulfonating agents may be used alone or in combination. As for the amount of addition of the sulfonating agents, these may preferably be used in an amount of 0.5 to 2 mols and more preferably in an amount of 0.7 to 1.5 mol to 1 mole of the aromatic ring contained in the styrene-based polymer (benzene ring in a side chain for a styrene-based resin and a benzene ring in the main chain for a polycarbonate resin). If added in an excessively small amount, the sulfonation agent cannot sufficiently sulfonate the styrene-based polymer. Thus, in such case, the high-molecular flocculant cannot display its function as the high-molecular electrolyte. Conversely, if added in an larger quantity, gelated products are yielded during the sulfonating reaction or by-products, such as salts, are yielded in larger quantities. Therefore, in this case, a large quantity of impurities are contained in the high-molecular flocculant, thus lowering its purity.

For sulfonating the strene-based polymer, the above-mentioned sulfonating agent may be used in conjunction with the Louis acid, which may be enumerated by alkyl phosphate, such as triethyl phosphate or trimethyl phosphate, dioxane, acrylic anhydride, ethyl acetate, ethyl palmitate diethyl ether and thioxane. The amount of addition of the Louis acid is 0.01 to 2.0 mol and preferably 0.02 to 1.0 mol of the aromatic ring contained in the styrene-based polymer (benzene ring in a side chain for a styrene-based resin and a benzene ring in the main chain for a polycarbonate resin). If added in an excessively small amount, gelated products tend to be yielded during the sulfonating reaction. If conversely the Louis acid is added in an excessive amount, the sulfonating reaction itself is retarded to lower the yield of the high-molecular flocculant to raise production cost.

The solvent used for sulfonating the styrene-based polymers may be enumerated by C1 to C2 aliphatic halogenated hydrocarbons (preferably 1,2-dichloroethane, chloroform, dichloromethane and 1,1-dichloroethane), and aliphatic cyclic hydrocarbons, preferably cyclohexane, methyl cyclohexane and cyclopentane. These solvents may be used alone or as a mixture. In mixing the solvents, there is no particular limitation to the mixing ratio.

The above-mentioned solvents may be used as a mixture with other solvents. These other solvents may be enumerated by paraffinic hydrocarbons (with 1 to 7 carbon atoms), acetonitrile, carbon disulfide, tetrahydrofuran, tetrahydropyrane, 1,2-dimethoxy ethane, acetone, methylethylketone and thiophene. Preferred of the other solvents are C1 to C7 paraffinic hydrocarbons, tetrahydrofuran, acetone and acetonitrile. Although there is no particular limitation to the mixing ratio with the other solvents, the mixing ratio is preferably in a range o 1 to 100 vol %. The above-mentioned solvents may be recovered, such as by extraction or distillation, after the end of the sulfonating reaction of the styrene-based polymer, for re-use in the next sulfonating reaction.

The above-mentioned anionic high-molecular flocculant can be obtained on mixing pre-set amounts of the sulfonating polymers, sulfonating agents and the solvent and continuing the sulfonating reaction.

In the course of the sulfonating reaction, the concentration of the styrene-based polymer is preferably 0.1 to 30 wt % and more preferably 0.5 to 20 wt %. If the concentration is lower than this range, it becomes difficult to introduce sulfone groups. If conversely concentration is lower than this range, gelated products tend to be yielded during the sulfonating reaction or non-reacted substances are yielded in large quantities.

The reaction temperature for this sulfonating reaction is 0 to 100° C. and preferably 15 to 80° C. If the reaction temperature is lower than this range in the sulfonating reaction, the sulfonating reaction is less liable to occur thus lowering the yield of the high-molecular flocculant.

In addition, in the present sulfonating reaction, the reaction time duration, exclusive of the sulfonating agent dripping time, is 10 minutes to 10 hours and preferably 30 minutes to 5 hours.

After the end of the sulfonating reaction of the solution, the sulfone groups are neutralized by a neutralizing agent and subsequently the solvent is distilled off to yield the desired high-molecular flocculant.

The neutralizing agent may be enumerated by oxides, hydroxides, carbonates, acetates, sulfonates, phosphates of basic compounds, such as alkali metals (sodium, lithium or potassium), alkali earth metals (magnesium or calcium), ammonia and a variety of amine compounds (primary to tertiary alkyl amines). This neutralizing agent is gradually added to the reaction system in the state of a solid or an aqueous solution to neutralize the sulfone groups introduced into the styrene-based polymer. The techniques for distilling off the solvent may be the techniques of liquid separation or distillation.

With the high-molecular flocculant of the present invention, thus obtained, its molecular weight Mw needs to be 150000 to 600000. If the molecular weight of the styrene-based polymer in the high-molecular flocculant is less than 150000, not only is the flocculant effect for the suspended substances in the liquid suspension lowered, but also the suspended substances are dispersed. Conversely, if the molecular weight of the styrene-based polymer is not less than 600000, the suspended substances are aggregated as coarse blocks such that optimum clarifying effects cannot be produced while the yielded cake is of high water content.

On the other hand, with the present high-molecular flocculant, not less than 40 mol % and preferably not less than 50 mol % of sulfone groups are introduced into the styrene-based polymer. If the content of the sulfone groups in the styrene-based polymer is smaller than 40 mol %, the high-molecular flocculant is lowered in solubility in water, thus significantly lowering the flocculant effect for the starting material in the liquid suspension.

For introducing a desired amount of sulfone groups, it is desirable for the styrene units to be contained in the styrene-based polymer in the high-molecular flocculant in an amount not less than 60 mol % and preferably in an amount not less than 80 mol %. If the amount of styrene units in the styrene-based polymer is less than 60 mol %, it becomes difficult to obtain the high-molecular flocculant, having the above-mentioned amount of sulfone groups by the sulfonating reaction.

Besides these high-molecular flocculants, flocculants of natural origin may be used in conjunction with the high-molecular flocculant of the present invention. The flocculants of natural origin may be enumerated by 'moroheiya', its dried product and extracts, jelly-like portion of the tomato seeds, its dried product or extract.

The 'moroheiya' is an annual grass of the genus Corcorus of the class shinanoki cultivated in Arabian tropical areas such as Egypt, Syria, Jordan or Iran, and is used from old as food as green to yellow vegetables. The viscous acidic polysaccharides as main component of the moroheiya are used as flocculant.

Specifically, the flower, stalk, root or portions thereof of moroheiya are turned into paste which is used as the flocculant. Alternatively, the flower, stalk, root or portions thereof of moroheiya are dried and pulverized in a mixer to produce powders which are used as the flocculant. For drying the moroheiya, drying in the sun, air in shade, vacuum drying, hot air drying or freeze drying may be optionally employed.

The tomato is an annual plant of the class eggplant in the temperate zone and used from old as food as green to yellow vegetables. It is the jelly-like portion around the tomato seed that is used as the flocculant.

Specifically, the jelly-like portion around the tomato seed is pulverized directly or in the dried state by a mixer to produce powders which are used as the flocculant. For drying, the techniques similar to those for the moroheiya are used.

Further, the paste or powders of the moroheiya or the jelly-shaped portion around the tomato seed or its dried product are processed by extraction with water, warm water, hydrophilic organic solvents (alcohols, ethers, N,N-dimethyl formamide or dimethyl sulfoxide sugar, or mixtures thereof, to produce a liquid extract which is used as the flocculant. The liquid extract may also be fractionated or dried for use as the flocculant. The liquid extract may preferably be water or warm water.

The liquid extract may be re-precipitated in an organic solvent as a poor solvent or the re-precipitated product may further be dried for use as a flocculant.

The liquid extract may be freed from solid substances by filtration, if so desired.

The alkalis may be ammoniac water, various amine compounds, sodium hydroxide, potassium hydroxide, potassium hydroxide and sodium carbonate. The acids may be organic acids, such as lactic acid, butyric acid, acetic acid or formic acid, and inorganic acids, such as sulfuric acid, hydrochloric acid and nitric acid.

Of course, the viscous portion of moroheiya and around tomato seeds may directly be used as the flocculant.

However, it is more effective to use the viscous portions as powders or liquid extract for facilitating the diffusion in the processing liquid (liquid suspension). Also, the viscous portions of moroheiya and around tomato seeds, processed with extraction with water, warm water or water-soluble organic solvents, are more meritorious than the directly dried viscous portions in flocculant effect per unit weight of the same solid substance.

If the polysaccharide component of moroheiya or the viscous portions around tomato seeds are pulverized or heated excessively, these components are lowered in flocculant activity due to the lowering of the molecular weight caused by cutting of the main and side chains or due to insolubility in water caused by the intramolecular cross-linking reaction.

The high-molecular flocculant of the present invention may be used in conjunction with any of the above-mentioned flocculants. If the high-molecular flocculant of the present invention is used in conjunction with reverse type high-molecular flocculants, special techniques need to be used for effective processing.

If, for example, the high-molecular flocculant of the present invention is charged positively, as when the high-molecular flocculant has a molecular structure portion added to with amino compounds such that it is converted to an acid salt or a quaternary ammonium salt, and if the high-molecular flocculant is used in conjunction with the above-mentioned anionic high-molecular flocculant, the two flocculants are of opposite polarities in water. Therefore, the flocculants are preferably used sequentially rather than as a mixture. Similarly, if the high-molecular flocculant of the present invention is charged positively, as when cyano groups are converted to carboxylic group via carbamoyl group, and if the high-molecular flocculant is used in conjunction with the above-mentioned cationic high-molecular flocculant, the two flocculants are of opposite polarities in water. Therefore, the flocculants are again preferably used sequentially rather than as a mixture.

If the two flocculants are used sequentially, any one of the cationic high-molecular flocculant and the anionic high-molecular flocculant may be charged first into water for processing. However, if the water for processing is sewage water, the cationic high-molecular flocculant is usually charged first, since the usual sewage water is generally processed with bactericidal treatment and hence the colloids are charged to negative polarity.

In the water processing method of the present invention, the high-molecular flocculant of the present invention may also be used in conjunction with inorganic flocculants or flocculation assistant agents.

The inorganic flocculants may be enumerated by aluminum sulfate, aluminum polychloride, sodium aluminate, ferrous chloride, ferric chloride, ferric sulfate, copper chloride, modified basic aluminum sulfate (LACS) and activated silica.

The flocculation assistant agents may, for example, be enumerated by slaked lime, sodium silicate, bentonite and flyash.

These ingredients are generally added in amounts of 0.001 to 2000 ppm and preferably 0.1 to 500 ppm, related to waste water, depending on the concentration of the starting material or the type of the dehydrating equipment.

Although there is no limitation to the type of the water for processing in accordance with the present invention, maximum effects can be produced when the water for processing is highly contaminated water, such as plant waste water having inorganic particles as the starting material.

The amount of addition of the high-molecular flocculant of the present invention to water for processing differs with the composition of the water for processing and with the combination with other starting material and the flocculation assistant agents. If the amount of addition is too small, the particles of the starting material cannot be flocculated sufficiently, whereas, if the amount is too large, the proportion of the high-molecular flocculant not contributing to flocculation is increased to lead to wastage of the high-molecular flocculant to give rise to renewed water contamination. The desirable range of addition is generally 0.001 to 2000 ppm and more preferably 0.1 to 500 ppm.

For processing waste water using the high-molecular flocculant of the present invention, coagulating agents, chelate resins, chelating agents, activated charcoal, ozonized water, ion exchange resins, water-absorptive resins, aqueous hydrogen peroxide, chlorine, liquid chlroline, sodium hypochlorite, chlorine dioxide, bleaching powder, chlorinated isocyan, diatomaceous earth, optical catalysts, such as titanium oxide, and biological processing agents, may be used.

Also, a variety of dehydrates, such as belt press dehydrator, centrifugal dehydrator or a screw press may be used. Dehydrated products, such as cakes, may be used for land filling using known techniques or converted into fuel or composts.

EXAMPLES

The present invention is hereinafter explained with reference to illustrative Examples based on experimental results.

[Modification of Cyano-group Containing High-molecular Waste Materials by Addition of Amino Compounds]

First, the high-molecular waste material containing cyano groups is reacted with amino compounds to produce a high-molecular flocculant in order to check into its properties.

The following three high-molecular waste materials, containing cyano groups, we used in the following experiments.

The resulting powders were analyzed by Fourier transform IR absorption spectrum (FT-IR) and nuclear magnetic resonance (NMR) spectrum. It was found that 80 mol % of cyano groups in the solid reaction product had been converted to imidazoline rings and that these imidazoline rings were not hydrolysed. The resulting powders were also soluble in water.

These powders were termed a high-molecular flocculant A. This high-molecular flocculant A was of the nonionic type.

Example 2

An imidazoline ring containing polymer was obtained in the same way as in Example 1 except using 3.5 g of ethylene diamine as an amino compound.

This polymer was dissolved in water and methyl chloride was injected into the resulting mass. The resulting product was reacted at 40° C. for two hours to yield an aqueous solution of a methyl chloride quaternary salt polymer of imidazoline, while non-reacted methyl chloride was distilled off on heating.

The resulting product was termed a high-molecular flocculant B. This high-molecular flocculant B was of the cationic type.

Example 3

1.0 g of small pieces of nitrile resin waste material b was dissolved in 100 ml of dimethyl sulfoxide (DMSO). To the resulting mass were dripped 2.3 g of ethanolamine at room temperature. The resulting mass was stirred in situ and heated to 100° C. to carry out the reaction for 12 hours.

After the end of the reaction, the reaction solution was poured into ethanol and precipitated. After filtration, the resulting product was rinsed with methanol and dried in vacuo at room temperature. The above processing yielded a polymer in which 85% of the cyano groups were replaced by an imino structure.

The resulting product was termed a high-molecular flocculant C. This high-molecular flocculant C was of the cationic type.

Example 4

An imino group containing polymer was obtained in the same way as in Example 3 except using 2.8 g of butylamine as an amino compound.

This polymer was dissolved in water and admixed with an aqueous solution of dilute sulfuric acid to set pH to 4.0 to obtain a sulfate polymer solution.

The resulting product was termed a high-molecular flocculant D. This high-molecular flocculant D was of the cationic type.

Example 5

A high-molecular flocculant was produced in the same way as n Example 2 except using SAN resin waste material c as a starting material.

This high-molecular flocculant was termed a high-molecular flocculant E which was of the cationic type.

Example 6

The high-molecular flocculant C was dissolved in water and the resulting aqueous solution was heated at 90° C. for 15 hours. After the end of the heating, the aqueous solution was dried to produce powders, for which the Fourier transform IR absorption spectrum (FT-IR) and nuclear magnetic resonance (NMR) spectrum were measured. By these measurements, it was confirmed that 70 mol % of the imino structure was hydrolysed and converted to an amide structure.

This high-molecular flocculant was termed a high-molecular flocculant F which was of the nonionic type.

Example 7

0.05 g of sulfur powdered and 1.0 g of small pieces of waste acrylic fiber material a were added to 20 g of ethylene diamine and reaction was carried out at 110° C. for six hours. After the end of the 110° C. reaction, non-reacted ethylene diamine was distilled off by distillation in vacuo and the residual mass was dissolved in water and precipitated with acetone.

The precipitates were then filtered and dried in vacuo at room temperature to produce brown powders. For these powders, the Fourier transform IR absorption spectrum (FT-IR) and nuclear magnetic resonance (NMR) spectrum were measured. By these measurements, it was confirmed that 42 mol % of the cyano groups of the solid reaction product were converted to imidazoline rings, and 18 mol % thereof were converted to—amino ethyl acrylamide which was a hydrolizate.

This polymer was then dissolved in water and a dilute aqueous solution of hydrochloric acid was added to the solution to give an aqueous solution of a hydrochlorate polymer.

This high-molecular flocculant was termed a high-molecular flocculant G which was of the nonionic type.

[Evaluation of Flocculant Performance]

The flocculant performance of these high-molecular flocculants A to G were evaluated.

In the following set of test examples, the following flocculants were used with a view to comparison or use with the inventive products.

Nonionic high-molecular flocculant H: commercial polyacrylamide cationic high-molecular flocculant I: methyl chloride quaternary product of commercial polydimethyl amino ethyl acrylate (potent cationic type)

anionic high-molecular flocculant J: commercial polyacryl amide partial hydrolyzate (mid anionic type)

sulfonate of waste resin material K: sodium polystyrene sulfonate (starting material: expanded styrene, sulfonation ratio: 80 mol %)

hydrolyzate L of waste fiber: polyacrylonitrile hydrolyzate (acrylic fibers processed with sodium hydroxide)

flocculant M of natural origin: dried pulverized moroheiya leaves

Evaluation Test 1

A 1 wt % aqueous solution of kaoline was prepared and used as a liquid suspension for evaluation of flocculation (this solution is hereinafter termed a liquid suspension). 100 ml of this liquid suspension were charged into a measuring cylinder with a co-plug having a capacity of 200 ml. The high-molecular flocculant and conventional high-molecular flocculants for comparison were dripped into the liquid suspension using measuring pipettes. The dripping amounts were set so that the concentration of the high-molecular flocculant in the liquid suspension was equal to 4 ppm.

After dripping, the measuring cylinder was stopped with the plug and turned upside down and restored repeatedly ten times. The measuring cylinder was then restored to the stationary state to measure the rate of precipitation of the suspended particles and the turbidity of the supernatant liquid. The measured results are shown in Table 1.

Acrylic fiber waste material a
  waste material of acrylic fibers for underwear containing not less than 95 mol % of acrylonitrile nitrile resin waste material b
  waste material of vessels for cosmetics containing not less than 90 mol % of acrylonitrile SAN (styrene-acrylonitrile) resin waste material c
  waste material of 8 mm cassette caging (transparent portions) containing 40 mol % of acrylonitrile The above three waste materials were processed into small-sized chips for use as starting material. The acrylic fiber waste material was severed by scissors into small-sized chips with each side 5 mm or less in length, while the nitrite resin waste material b and the SAN resin waste material c were severed by a cutter type crusher into small-sized chips not larger than 16 mesh for use as starting material.

Example 1

4 g of 1,3-propane diamine, 0.03 g of sulfur powders and 1.0 g of small pieces of acrylic fiber waste material a were charged into 40 g of cyclohexane and stirred in situ to carry out an addition reaction at 60° C. for four hours.

A green solid substance, precipitated on the bottom of the reaction vessel, was taken out and dissolved. The resulting solution was poured into a large quantity of acetone and precipitated.

The precipitate was then filtered and dried in vacuo at room temperature to yield pale yellow powders.

TABLE 1

| high molecular flocculant | appellation ion type | A | C | F | G | H |
|---|---|---|---|---|---|---|
| | | | | Nonionic type | | |
| rate of precipitation (m/n) | | 23 | 21 | 22 | 20 | 16 |
| turbidity (ppm) | | 12 | 8 | 10 | 13 | 32 |

It is seen from table 1 that nonionic high-molecular flocculants, modified by addition of the amino compound to the cyano group, showed more satisfactory results in the rate of precipitation and in turbidity of the supernatant liquid than the conventional nonionic flocculant and exhibited superior flocculating performance.

Evaluation Test 2

The processed liquid, obtained on primary flocculation of waste water from an electronic parts plant (pH 6.5, SS 1.5 wt %) was used as a liquid suspension for evaluation of flocculation.

100 ml of the liquid suspension were charged into a measuring cylinder with a co-plug, having a capacity of 200 ml and each flocculant was dripped into the liquid suspension using a measuring pipette. The dripping amount was set so that the high-molecular flocculant in the liquid suspension will be of the concentration equal to 2 ppm. If two sorts of the liquid suspension were used together, these flocculants were mixed together so that the above concentration will be equal to 1 ppm.

After dripping, the measuring cylinder was stopped with the plug and turned upside down and restored repeatedly ten times. The measuring cylinder was then restored to the stationary state to measure the rate of precipitation of the suspended particles, turbidity of the supernatant liquid and the water content of the cake obtained after filtration by a filter cloth. The measured results are shown in Table 2.

TABLE 2

| high molecular flocculant | appellation ion type | A | A + J | F + J | J |
|---|---|---|---|---|---|
| | | | Anionic | | |
| rate of precipitation (m/h) | | 23 | 28 | 25 | 16 |
| turbidity (ppm) | | 12 | 8 | 10 | 32 |
| water content (%) | | 73 | 70 | 68 | 75 |

It is seen from table 2 that the high-molecular flocculant of the present invention was superior to the conventional anionic flocculant in the rate of precipitation, turbidity of the supernatant liquid and in water content of the cake. It has also been seen that the high-molecular flocculant of the present invention can further be improved in flocculation performance by using it as a mixture with commercial anionic flocculants.

Evaluation Test 3

A mixed sludge from a sewage processing plant (pH, 6.2; SS 2.5 wt %) was put to a jar test.

First, 0.5 wt % per SS of a cationic high-molecular flocculant was added to the sludge being agitated by a jar tester and agitated for flocculation. If two sorts of the high-molecular flocculant were used as a mixture, the charged amounts of the flocculants were set to 0.2 wt % per SS. To the resulting product was further added 0.2 wt % of the anionic high-molecular flocculant per SS and agitated for flocculation.

The flocculated mass was then allowed to stand and measurement was then made of the rate of precipitation of suspended particles, turbidity of the supernatant liquid and the water content of the cake obtained on filtration. The measured results are shown in table 3.

TABLE 3

| | B | D | E | G | B + M | I | I | I |
|---|---|---|---|---|---|---|---|---|
| cationic flocculant | B | D | E | G | B + M | I | I | I |
| anionic flocculant | — | J | K | L | J | — | J | K |
| precipitation rate (m/h) | 37 | 41 | 44 | 42 | 45 | 24 | 29 | 27 |
| turbidity (ppm) | 27 | 22 | 25 | 23 | 20 | 43 | 36 | 33 |
| water content (%) | 73 | 72 | 71 | 72 | 71 | 77 | 76 | 75 |

It is seen from table 3 that the high-molecular flocculant of the present invention was superior to the conventional anionic flocculant in the rate of precipitation, turbidity of the supernatant liquid and in water content of the cake both when used alone and when used in conjunction with the anionic flocculant. It has also been seen that the high-molecular flocculant of the present invention can further be improved in flocculation performance by using it as a mixture with flocculants of natural origin.

[Modification of Waste High-molecular Material by Hydrolysis of Cyano Groups]

The following four high-molecular materials were used as base materials for hydrolysis in the respective Examples.

waste acrylic fibers d waste acrylic fibers for underwear containing not less than 90 mol % of acrylonitrile;

waste nitrile rubber e waste oil-resistant rubber and hose material containing not less than 40 mol % of acrylonitrile;

waste nitrile resin f waste vessels for cosmetics containing not less than 90 mol % of acrylonitrile;

SAN (styrene-acrylonitrile) waste resin g waste battery casing material containing not less than 30 mol % of acrylonitrile;

The waste material d was severed with scissors into small pieces each having a side measuring 5 mm or less.

The waste material e was freeze-pulverized to small pieces each measuring 32 mesh or less.

The waste materials f and g were pulverised to small pieces measuring 32 mesh or less using a cutter type pulveriser.

Example 8

0.6 g of the waste material d was charged into 30 g of 96% sulfuric acid and agitated in in situ to carry out acidic hydrolysis at 50° C. for two hours. The waste material d was completely dissolved in sulfuric acid.

Next, this mixture was poured in a large quantity of acetone to yield a white precipitate, which was further washed twice or thrice with acetone and dried.

The dried powders were analyzed by measurement with the Fourier transform IR absorption spectrum (FT-IR) and nuclear magnetic resonance (NMR) spectrum. By these measurements, it was confirmed that not less than 90 mol % of the cyano groups in the waste material d were converted to carbamoyl groups and that carboxylic groups were generated under the above-mentioned reaction conditions. These powders were also readily soluble in water.

These powders were termed a high-molecular flocculant N. The ion type of this high-molecular flocculant N was the nonionic type.

Example 9

The acid hydrolysis was carried out by the same method as in Example 8 except using the waste material e and setting the reaction temperature and reaction time to 80° C. and 4 hours, respectively.

The FT-IR and NMR measurements, conducted on the resulting powders, revealed that not less than 90 mol % of the cyano groups in the waste material e were converted to carbamoyl groups and that no carboxylic groups were generated under the above-mentioned reaction conditions. These powders were also readily soluble in water.

These powders were termed a high-molecular flocculant O. The ion type of this high-molecular flocculant O was the nonionic type.

Example 10

The acid hydrolysis was carried out by the same method as in Example 8 except using the waste material f and setting the reaction temperature and reaction time to 80° C. and 4 hours, respectively.

The FT-IR and NMR measurements, conducted on the resulting powders, revealed that not less than 90 mol % of the cyano groups in the waste material f were converted to carbamoyl groups and that no carboxylic groups were generated under the above-mentioned reaction conditions. These powders were also readily soluble in water.

These powders were termed a high-molecular flocculant P. The ion type of this high-molecular flocculant P was the nonionic type.

Example 11

The acid hydrolysis was carried out by the same method as in Example 8 except using the waste material g and setting the reaction temperature and reaction time to 80° C. and 4 hours, respectively.

The FT-IR and NMR measurements, conducted on the resulting powders, revealed that not less than 90 mol % of the cyano groups in the waste material g were converted to carbamoyl groups and that no carboxylic groups were generated under the above-mentioned reaction conditions. These powders were also readily soluble in water:

These powders were termed a high-molecular flocculant Q. The ion type of this high-molecular flocculant Q was the nonionic type.

Example 12

1 g of the waste material d was charged into 40 g of cyclohexane and, as the temperature of the reaction system was controlled to 25 to 30° C., 1.8 g of sulfuric anhydride was dripped over 30 minutes. After the end of dripping, agitation was continued for further 30 minutes. 30 g of water were added to the reaction system to carry out hydrolysis at 30° for one hour.

The reaction mixture was distilled in vacuo to remove cyclohexane and the residual liquid was adjusted to pH of 6 to produce a high-molecular aqueous solution. The FT-IR and NMR measurements, conducted on the resulting high-molecular aqueous solution, revealed that not less than 90 mol % of the cyano groups in the waste material d were converted to carbamoyl groups and that no carboxylic groups were generated under the above-mentioned reaction conditions. These powders were also readily soluble in water.

These powders were termed a high-molecular flocculant R. The ion type of this high-molecular flocculant R was the nonionic type.

Example 13

To a 1%-aqueous solution of the high-molecular flocculant N, obtained in Example 8, sodium hydroxide (NaOH) equivalent to 50 mol % of carbamoyl groups of the high-molecular flocculant N was added to carry out alkaline hydrolysis at 80° C. for one hour.

The FT-IR and NMR measurements, conducted on the resulting high-molecular aqueous solution, revealed that, of the carbanoyl groups of the high-molecular flocculant N, 90 mol % of the added amount of NaOH, corresponding to 45 mol % of the initial carbamoyl group content, were converted to sodium salt type carboxylic groups.

These powders were termed a high-molecular flocculant S. The ion type of this high-molecular flocculant S was the anionic type.

Example 14

To a 1%-aqueous solution of the high-molecular flocculant R, obtained in Example 12, sodium hydroxide (NaOH) in an equimolar amount to carbamoyl groups of the high-molecular flocculant R was added to carry out alkaline hydrolysis at 80° C. for one hour.

The FT-IR and NMR measurements, conducted on the resulting high-molecular aqueous solution, revealed that, of the carbamoyl groups of the high-molecular flocculant R, 90 mol % of the added amount of NaOH, corresponding to 90 mol % of the initial carbamoyl group content, were converted to sodium salt type carboxylic groups.

These powders were termed a high-molecular flocculant T. The ion type of this high-molecular flocculant T was the anionic type.

The high-molecular flocculants obtained in Examples 8 to 14 are indicated collectively in Table 4.

TABLE 4

| Ex. | Starting material and hydrolysis type (catalysts for hydrolysis are given in parentheses) | Acrylonitrile content in starting material (mol %) | Content of functional groups after modification (mol %) | | State of products | Appellation and ion type of high-molecular flocculant |
|---|---|---|---|---|---|---|
| 8 | Waste acrylic fibers: d; acidic hydrolysis (concentrated sulfuric acid) | >90 | —CN<br>—CONH$_2$<br>—COOH | <9<br>>81<br>— | Water-soluble, white powders | N: nonionic |
| 9 | Waste nitrile rubber: e; acidic hydrolysis (concentrated sulfuric acid) | >40 | —CN<br>—CONH$_2$<br>—COOH | <4<br>>36<br>— | Water-soluble, white powders | O: nonionic |
| 10 | Waste nitrile rubber: f; acidic hydrolysis (concentrated sulfuric acid) | >90 | —CN<br>—CONH$_2$<br>—COOH | <9<br>>81<br>— | Water-soluble, white powders | P: nonionic |
| 11 | Waste styrene-acrylonitrile resin: g; acidic hydrolysis (concentrated sulfuric acid) | >30 | —CN<br>—CONH$_2$<br>—COOH | <3<br>>27<br>— | Water-soluble, white powders | Q: nonionic |
| 12 | Waste acrylic fibers: d; acidic hydrolysis (sulfuric anhydride) | >90 | —CN<br>—CONH$_2$<br>—COOH | <9<br>>81<br>— | High-molecular aqueous solution | R: nonionic |

TABLE 4-continued

| Ex. | Starting material and hydrolysis type (catalysts for hydrolysis are given in parentheses) | Acrylonitrile content in starting material (mol %) | Content of functional groups after modification (mol %) | State of products | Appellation and ion type of high-molecular flocculant |
|---|---|---|---|---|---|
| 13 | Product N of Ex. 8; acidic hydrolysis (concentrated sulfuric acid) + alkaline hydrolysis (NaOH) | >90 | —CN <9<br>—CONH$_2$ >45<br>—COOH >36 | High-molecular aqueous solution | S: nonionic |
| 14 | Product R of Ex. 12; acidic hydrolysis (sulfuric anhydride) + alkaline hydrolysis (NaOH) | >90 | —CN <9<br>—CONH$_2$ >8<br>—COOH >73 | High-molecular aqueous solution | T: nonionic |

In Table 4, the content of the as-modified functional groups refers to the total number of mols of the monomeric units making up the high-molecular material.

[Evaluation of Flocculating Performance]

Next, the flocculating performance of the high-molecular flocculants N to T was evaluated.

In the following set of the evaluation tests, the following two commercial high-molecular flocculants U, V were used with a view to comparison and conjunctive use with the inventive products.

High molecular Flocculant U
partial hydrolyzate of polyacrylamide portion (hydrolyzation rate, 20 mol %), anionic type High molecular Flocculant V
Methyl chloride quaternary product of dimethyl amino ethyl acrylate, potent cationic type Evaluation Test 4

0.2 wt % of aluminum sulfate as added to a 4 wt %-aqueous solution of kaoline to give a colloidal liquid suspension for flocculation evaluation (referred to hereinafter as liquid suspension).

100 ml. of this liquid suspension were charged into a measuring cylinder with a co-plug having a capacity of 200 ml. The high-molecular flocculants N to T and conventional high-molecular flocculants for comparison were dripped into the liquid suspension using measuring pipettes. The dripping mounts were set so that the concentration of the high-molecular flocculant in the liquid suspension was equal to 5 ppm.

After dripping, the measuring cylinder was stopped with the plug and turned upside down and restored repeatedly ten times. The measuring cylinder was then restored to the to the stationary state to measure the rate of precipitation of the suspended particles and the turbidity of the supernatant liquid.

The measured results are shown in Table 5.

TABLE 5

| high-molecular flocculant | a ion | N | O | P | Q | R | S | T | U |
|---|---|---|---|---|---|---|---|---|---|
| | | | | nonionic | | | | anionic | |
| rate of precipitation (m/h) | | 15 | 13 | 14 | 13 | 16 | 17 | 18 | 10 |
| turbidity (ppm) | | 35 | 45 | 43 | 48 | 32 | 28 | 25 | 50 |

On comparison of the flocculating performance of the high-molecular flocculants N to T of the present invention according to ion types, the anionic type high-molecular flocculants S and T are superior to the nonionic type high-molecular flocculants N to R. Therefore, in flocculating the colloidal system in which kaoline is flocculated primarily with aluminum sulfate used in the present Example, the anionic type high-molecular flocculants S and T may be said to be superior to the hydrogen bonded type nonionic high-molecular flocculants N to R.

Thus, on comparing the flocculating performance of the same anionic type flocculants, the anionic type high-molecular flocculants S and T of the present invention are superior to the conventional anionic type high-molecular flocculant. Moreover, the conventional product U was inferior in performance the nonionic type high-molecular flocculants N to R of the present invention.

This indicated the superior flocculating performance of the inventive products.

Evaluation Test 5

500 ppm of aluminum sulfate were added to the waste water of an electronic parts plant (pH, 4.8; mass of the floating substance (SS) of 1.2 wt %) to prepare a liquid suspension for flocculation evaluation (referred to hereinafter as liquid suspension).

100 ml of this liquid suspension were charged into a measuring cylinder with a co-plug having a capacity of 200 ml. An aqueous solution of the high-molecular flocculant was dripped into the liquid suspension using measuring pipettes. The high-molecular flocculants used here were the nonionic high-molecular flocculants N, O, anionic high-molecular flocculants S, T and the conventional anionic high-molecular flocculant U.

The inventive products N, O and S were used as an 50–50 mixture with the conventional product U, whilst the inventive product T and the conventional product U were used alone. The high-molecular flocculants were added in amounts which would give concentration of 10 ppm in the liquid suspension. Thus, if the two flocculants were used in conjunction, the inventive product and the conventional product are used each in the concentration of 5 ppm.

After dripping, the measuring cylinder was stopped with the plug and turned upside down and restored repeatedly ten times. The measuring cylinder was then restored to the stationary state to measure the rate of precipitation of the suspended particles and the turbidity of the supernatant liquid. The precipitate yielded was dehydrated on a filter cloth to measure the water content in the cake.

The measured results are shown in table 6.

TABLE 6

| high-molecular flocculant | Inventive appellation ion type | N | O | S | T | — |
|---|---|---|---|---|---|---|
| | | nonionic | | anionic | | |
| | conventional (anionic) | | U | — | | U |
| rate of precipitation (m/h) | | 25 | 22 | 28 | 22 | 20 |
| turbidity (ppm) | | 12 | 15 | 10 | 8 | 30 |
| water content of cake after dehydration (ppm) | | 71 | 73 | 70 | 68 | 75 |

On comparing the case of using the high-molecular flocculant T of the present invention to that of using the conventional high-molecular flocculant U, as cases of using the sole high-molecular flocculant, the inventive product is superior in flocculating performance. It is noted that these two flocculants are both of the anionic type. The conventional product, inferior by itself to the inventive product, is improved in flocculating performance on combination with the inventive products N, O and S. This verified superior flocculating performance proper to the inventive product.

However, in any of the above cases of combined use, the flocculating performance of the present invention in which anionic high-molecular flocculants T was used by itself could not be surpassed as far as turbidity was concerned. This is probably ascribable to the fact that the inventive product is smaller in molecular weight and higher in anionic efficiency than the conventional product.

Similar effects could be obtained when the commercial high-molecular flocculant used on mixing with the inventive product was changed to the nonionic type.

Evaluation Test 6

A jar test was conducted on a mixed sludge from a sewage processing plant (pH, 6.6; SS, 2.8 wt %). Specifically, as the above mixed sludge was agitated by the jar tester, the commercial high-molecular flocculant V was added in a first step to the agitated sludge at a rate of 0.6 wt %. Then, at a second step, the high-molecular flocculants P, Q or T or the conventional anionic high-molecular flocculant U was added each at a rate of 0.15 wt % to the suspended particles.

After agitation, the liquid suspension was allowed to stand stationarily and measurements were made of the rate of precipitation of the suspended particles and turbidity of the supernatant liquid. Also, the produced precipitates were dehydrated on a filter cloth to measure the water content of the cake.

The measured results are shown in Table 7.

TABLE 7

| high-molecular flocculant | Inventive | appellation ion type Conventional | ②P Nonionic ①*V (cationic) | ②Q | ②T anionic | — ①V (cationic) ②P (anionic) |
|---|---|---|---|---|---|---|
| rate of precipitation (m/h) | | | 41 | 38 | 44 | 33 |
| turbidity (ppm) | | | 25 | 28 | 22 | 38 |
| water content of cake after dehydration (ppm) | | | 72 | 73 | 71 | 75 |

*① and ② denote first and second stages, respectively.

In general, if the composition of the suspended particles is complex or cannot be known correctly, static charges of the colloidal particles is also thought to be nonuniform. It is therefore thought to be effective to use the high-molecular flocculant of the cationic type and that of the nonionic type simultaneously. On comparison of the combination of the conventional cationic type flocculant and the conventional cationic type flocculant to the combination of the cationic and anionic type inventive products, it has been found that the combination of the inventive products manifested superior flocculant effects.

In particular, the optimum flocculating effects can be obtained on combining the conventional high-molecular flocculant and the inventive high-molecular flocculant.

Although cationic high-molecular flocculant cannot as a principle be manufactured on hydrolysis of cyano groups, waste water processing can be achieved more effectively by using the inventive flocculant in combination with the cationic commercial flocculant.

Although the preferred embodiments of the present invention and the results of evaluating tests have been explained in the foregoing, it should be noted that these embodiments have been given for illustration purposes and are not intended for limiting the scope of the invention. Specifically, the present invention can be optionally modified as to the types of the starting materials for the high-molecular flocculant or conditions for addition reaction, hydrolytic reaction, acid salt formation or water processing.

What is claimed is:

1. A method for producing a high-molecular weight flocculant comprising the step of:

hydrolyzing a high-molecular weight polymeric material having at least one cyano group thereby converting at least a portion of said at least one cyano group into at least one carbamoyl group.

2. The method according to claim 1 wherein said hydrolyzing step occurs in the presence of an acidic catalyst.

3. The method according to claim 1, said hydrolyzing step further comprises the steps of (a) employing an acidic catalyst; and (b) employing a basic catalyst, wherein, said at least one carbamoyl group is converted into at least one carboxylic group or salts thereof.

4. The method according to claim 1 wherein said high-molecular weight polymeric material comprises acrylonitrile as a monomer unit.

5. The method according to claim 1 wherein said polymeric material is selected from the group consisting of acrylic fibers, nitrite resins, styrene-acrylonitrile resins, acrylonitrile-butadiene-styrene resins, acrylonitrile-styrene-acrylic resins, acrylonitrile-chlorinated polyethylene-styrene resins, nitrite rubbers and acrylonitrile-butadiene rubbers.

6. The method according to claim 1 wherein said polymeric material comprises at least one cyano group wherein said at least one cyano group comprises not less than 15 mol % of the total monomer units present in said polymeric material.

* * * * *